July 9, 1940.  G. J. SNYDER  2,207,687
EXTERIOR BUILDING PANEL
Filed June 5, 1939
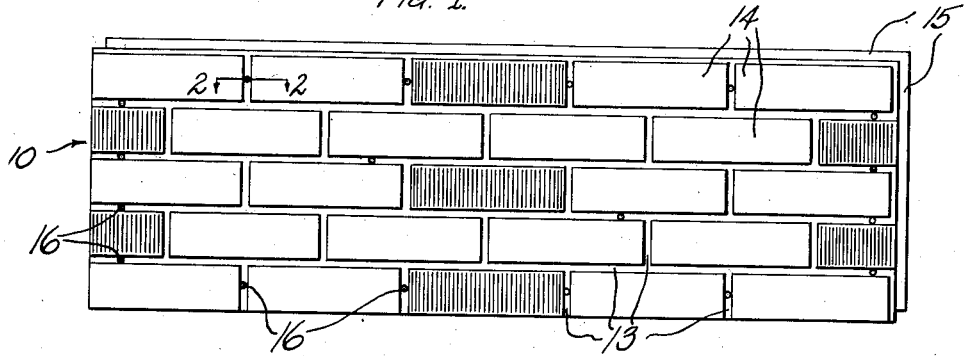
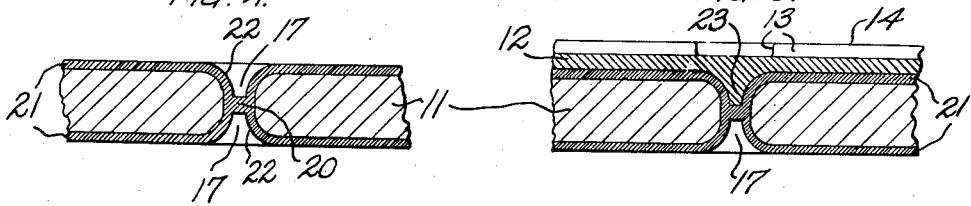
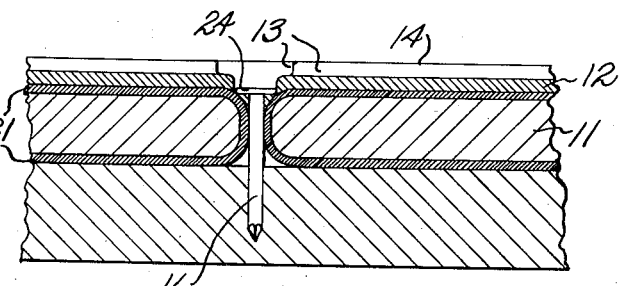
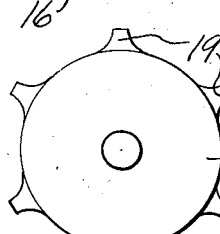
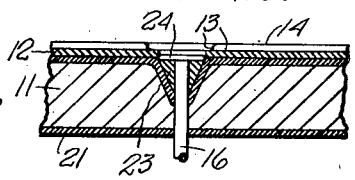
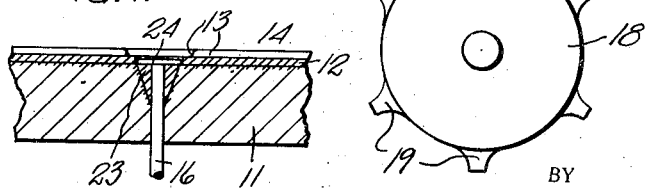
INVENTOR.
GILBERT J. SNYDER
BY Oltsch + Knoblock
ATTORNEYS.

Patented July 9, 1940

2,207,687

UNITED STATES PATENT OFFICE 2,207,687

EXTERIOR BUILDING PANEL

Gilbert J. Snyder, South Bend, Ind., assignor to Mastic Asphalt Corporation, South Bend, Ind., a corporation of Indiana Application June 5, 1939, Serial No. 277,377

9 Claims. (Cl. 20—5)

This invention relates to exterior building panels, and more particularly to such panels formed of rigid composition or insulation board which is waterproofed and coated with decorative surface material and adapted to be nailed at portions thereof exposed to the weather.

Considerable difficulty is experienced with such panels at the points at which they are nailed. The possibility and likelihood of driving the nail too deeply into the material and to an extent that the nail head impinges upon and exposes fibers thereof which are not waterproofed is great. It is difficult and time-consuming to attempt to seal over the nail heads. Also, expansion and contraction incident to weather conditions may serve to cause leaks around the nails in course of time. Therefore, it is the primary object of this invention to provide a panel of this character with novel reinforced and waterproofed portions at the points thereof which are to be sealed.

A further object is to provide a panel of this character having depressions formed therein to extend partially therethrough and provide a reduced thickness portion, the walls of said recess and said reduced thickness portion being saturated with waterproofing material.

A further object is to provide a panel of this character having recesses at spaced points thereof at which it is to be nailed, said recesses being filled with waterproofing material in which the shank of a nail whose head bears on the board at the mouth of the recess is imbedded to be sealed.

A further object is to provide a panel of this character having nailing portions at which the composition board is recessed, saturated with waterproofing material at the recess to harden the board, and having the recess filled with waterproofing material, whereby all fibers engaging the nail are thoroughly waterproofed and the outer end of the nail shank is imbedded in waterproofing material.

Other objects will be apparent from the description and appended claims.

In the drawing:

Fig. 1 is a face view of a building panel illustrating the nailing thereof.

Fig. 2 is a fragmentary sectional view illustrating my nailing construction and a nail therein, taken on line 2—2 of Fig. 1.

Fig. 3 is a fragmentary sectional view similar to Fig. 2 of the panel per se.

Fig. 4 is a fragmentary sectional view of the nailing portion of the panel without the surface coating.

Fig. 5 is a diagrammatic view illustrating one step in the manufacture of the panel.

Fig. 6 is a fragmentary cross sectional view similar to Fig. 2, of a modified embodiment of the invention.

Fig. 7 is a fragmentary cross sectional view, similar to Fig. 2, of another modified embodiment of the invention.

Referring to the drawing, which illustrates the preferred embodiment of the invention, the numeral 10 designates my exterior building panel, which is preferably formed of rigid composition or insulation board 11, such as "Celotex" or "Insulite." The panel has one face coated with a layer 12 of thermo-plastic waterproofing such as asphalt, and any suitable surfacing material such as crushed brick granules or the like. The coated face is provided with a plurality of narrow elongated grooves or depressions 13 at which the asphalt is preferably completely exposed. These grooves simulate mortar joints and outline small areas 14 of the face of the panel simulating masonry faces, usually brick faces. The panel is provided with marginal ship-lap flanges 15 by means of which a weathertight joint may be effected between the same and abutting coplanar panels. The panels are each secured to place by nails 16, of which a plurality are used at each panel as best illustrated in Fig. 1.

Each of the panels must be nailed at substantially the same places in order to be properly and securely mounted. At each of such places I propose to form in the board, prior to the application of coating 12, a pair of registering recesses 17 at the opposite sides of the board. The recesses are of tapering form, with their inner ends of a diameter equal to or slightly smaller than the thickness of the shank of nails 16, and the mouths thereof preferably smaller than the heads of said nails. The recesses 17 may be formed, as illustrated in Fig. 5, by passing the board 11 between rolls 18 having a plurality of studs 19 conforming in shape to that of the recess 17 as desired, with the rolls so arranged and driven that correspondingly positioned studs 19 thereof will register to form registering recesses in opposite faces of the board. The studs 19 compress the board between the registering recesses to provide a web 20.

Board 11 is saturated to a shallow thickness at 21 adjacent each surface thereof. The board may be treated to produce this surface saturation 21 either before or after recesses 17 have been formed. Thus I have found that by treating the board after the recesses have been formed, a very satisfactory surface saturation is obtained, which saturation will extend into the walls of the recesses at 22, and will completely saturate web 20. On the other hand, I have also found that if the board is surface saturated before being recessed, equally satisfactory results are obtained. The action in the last named sequence appears to entail a stretching and deforming of the surface saturation without breakage thereof, and a concurrent lateral displacement of the unsaturated core until the opposed surface saturated portions or skins are brought into contact and caused to adhere to form the completely saturated web 20.

After the board 11 has been surface saturated and recessed, as illustrated in Fig. 4, the surface coating 12 is applied to one face thereof, with portions 23 thereof filling the recesses 17 at the coated face. Then, as the coating 12 is being contoured to provide grooves 13, small indents or the like (not shown) may be formed in said coating 12 in registration with recesses 17, to serve as indicia or guides for nailing. The recesses 17 preferably all underlie the grooves 13, so as to be readily formed therewith.

In use, an applicator drives nails 16 at the points indicated or designated on the surface coating. The nail shank passes through the waterproofing 12, including the portion 23 thereof within recess 17, and then pierces and passes through saturated web 20. Saturation of web 20 serves both to waterproof the fibers of the board at that point and to strengthen and rigidify the web. As the nail is driven home, its head 24 is pressed into the coating 12 and seats against the rigidified and strengthened surface-saturated shoulders at the mouth of recess 17. This provides a positive seal around the outer end of the nail shank and permits the nail head to solidly anchor the board. This anchor is also enhanced by the substantial extent of surface contact of the saturated board with the nail shank resulting from the penetration of web 20 and the small diameter of the inner ends of the recess 17.

One advantage of this construction is that the interruption of the normal insulating properties or value of the board occurring by reason of the nailing portion is very small. A further advantage is that the board is not completely pierced, and hence if a nail is not driven at each nailing portion no danger of leakage or air penetration is entailed incident to accidental penetration of the weatherproof coating 12, or incident to expansion and contraction or adverse weather condition which might produce hair cracks or fissures in the weatherproof coating.

I have also found that substantially the same advantages as above defined are obtained by the constructions of Figs. 6 and 7. In Fig. 6 a depression is formed in only once face of the composition board to define a reduced thickness inset board portion at its base, with the board, including the recess, surface saturated, and then coating the recessed face of the board at 12 and filling the recesses at 23 with heated thermo-plastic waterproofing material. In Fig. 7 the recess is formed in only the coated board face, without surface saturation, but the fibers of the board are at least shallowly impregnated by the waterproofing material at the walls and bases of the recess to rigidify and waterproof the same. Hence, when a nail 16 is driven to pass through the recess and pierce the reduced thickness base of either Fig. 6 or 7 construction, with its head 24 bearing on the board at the mouth of the recess, the same is thoroughly waterproofed by the imbedding of the outer end of its shank in the waterproofing material filling the recess.

I claim:

1. An exterior building panel comprising a composition board having a pair of registering recesses formed in opposite faces and spaced from the edges thereof for nailing, said recesses being separated by a web intermediate the thickness of said board, at least one recess having a portion of a diameter at least as large as the shank of a nail employed to secure said panel said board being saturated with waterproofing material to a shallow depth at all surfaces including the walls of said recesses, said web being completely saturated with waterproofing material, and a waterproof coating on one surface of said board, said coating filling the recess in the surface which is coated the major portion of said board being unsaturated to retain its full insulating properties.

2. An exterior building panel as defined in claim 1, wherein said recesses taper inwardly from a diameter greater than to a diameter not exceeding the thickness of a nail employed to secure said panel.

3. An exterior building panel comprising an insulation board adapted to be nailed at points spaced from its margin and exposed to the weather when applied, said board being recessed at each nailing point to provide a compacted inset reduced thickness integral web at the inner end of the recess, the walls of said recesses being saturated with waterproofing material to a shallow depth and said web being completely saturated, and waterproofing material filling said recess, said nail points constituting only a small portion of the entire board, and the remainder of the board retaining its full insulating properties.

4. An exterior building panel comprising a composition board coated with waterproofing material adapted to be nailed at points spaced from the edges thereof and exposed to the weather, said board having a recess of a depth less than the thickness of the board at each nailing point, the walls of said recess being surface saturated with waterproofing material and the base of said recess being completely impregnated with waterproofing material, said recess being filled with waterproofing material, said nailing points being spaced apart with the portions of the board therebetween retaining their full insulating value.

5. An exterior building panel adapted to be nailed at points spaced from the edges thereof and exposed to the weather, comprising a composition board having a recess of a depth less than the thickness of the board at each nailing point, and a coating of waterprofing material covering the recessed face of said board and filling said recess, the mouth of said recess being greater than the shank and no wider than the head of a nail and the base diameter of said recess being no greater than the diameter of the nail shank, the board portion surrounding each nailing point having its insulation properties unimpaired.

6. An exterior building panel as defined in claim 5 wherein at least the portion of the board at the mouth of the recess against which the head of a nail bears is hardened.

7. An exterior building panel adapted to be nailed at points spaced from the edges thereof and exposed to the weather, comprising an insulation board having registering recesses at the opposite faces thereof at each nailing point separated by a thin integral web, and waterproofing material coating one face of said board and filling the recesses at said face, the insulation board retaining its normal insulation characteristics at all points thereof except said recessed portions.

8. An exterior building panel adapted to be nailed at points spaced from the edges thereof and exposed to the weather, comprising a composition board having a narrow tapering recess at each nailing point providing a reduced thickness web at its inner end, said web and the surfaces of said board at and around said recesses being harder than the interior of said board, waterproof material covering one face of said board and filling said recess, the nails being driven to pierce said webs with their heads bearing on the hardened surfaces at the mouth of said recesses whereby the outer ends of the nail shanks are imbedded in the waterproof material in said recess.

9. An exterior building panel adapted to be nailed at points exposed to the weather and spaced from the edges thereof, comprising a composition board having a preformed recess at each nailing point providing a reduced thickness inset board portion at its base, and waterproofing material filling said recess, at least a portion of said recess being of a dimension intermediate the size of the shank and head of a nail extending therethrough and piercing said inset board portion whereby the portion of the shank thereof adjacent the head is encompassed and sealed by said waterproofing material.

GILBERT J. SNYDER.